United States Patent [19]

Zimmerman

[11] Patent Number: 4,683,415
[45] Date of Patent: Jul. 28, 1987

[54] LINE FREQUENCY SWITCHING POWER SUPPLY

[75] Inventor: Matt J. Zimmerman, Aloha, Oreg.

[73] Assignee: Tektronix, Inc., Beaverton, Oreg.

[21] Appl. No.: 906,872

[22] Filed: Sep. 15, 1986

[51] Int. Cl.$^4$ .............................................. G05F 1/46
[52] U.S. Cl. ................... 323/282; 323/235; 323/319; 363/86; 363/89
[58] Field of Search ............ 363/86, 89; 323/235, 323/265, 266, 319, 282–285

[56] References Cited

U.S. PATENT DOCUMENTS 4,626,982 12/1986 Huber ............................... 363/89 X Primary Examiner—Peter S. Wong
Assistant Examiner—Emanuel T. Voeltz
Attorney, Agent, or Firm—George T. Noe

[57] ABSTRACT

A line-frequency switching power supply for producing a regulated D.C. output voltage includes a pass element disposed between a rectifier circuit and an output terminal to which a filter is connected. The pass element is enabled when a zero-crossing of line voltage is detected, and switched on when the line voltage exceeds the voltage on the filter capacitor plus the operational drop across the pass element. The pass element is switched off when the output reaches a preselected D.C. output level, tripping a switch. Since the pass element is switched on for only a portion of a cycle of line voltage, power dissipation is minimized and efficiency is kept high. Regulators of type described herein suitably may be stacked on a single secondary winding to produce multiple output voltages, or may suitably function as preregulators for following linear regulators to produce very stable and constant D.C. output voltages with minimum power dissipation.

2 Claims, 5 Drawing Figures

LINE FREQUENCY SWITCHING POWER SUPPLY

BACKGROUND OF THE INVENTION

The present invention relates to power supplies in general, and in particular to a line-frequency switching series-pass transistor stage in a power supply.

There are many types of power supplies for providing stable, regulated DC voltages to operate electronic equipment and circuits therein. Conventional linear supplies, which typically comprise an electronically regulated pass transistor coupled to the output of a rectifier and filter network, are designed for worst-case low power line operation and dissipate unused power in the form of heat. That is, the line voltage range may be from 90 volts AC to 130 volts AC, and to maintain a constant output DC voltage over that range, the pass transistor must drop the unused voltage generated by the rectifier. Moreover, since the pass transistor conducts over the full line-voltage cycle, large heatsinks may be required to dissipate the unused power.

Recent trends in power supply design have been away from linear types to switching types because switching power supplies have higher conversion efficiency, less bulk, and dissipate less energy in the form of heat. Switching power supplies, however, typically are considerably more complex than linear supplies, and operate at fairly high frequencies, e.g., from several kilohertz to several megahertz, and as a consequence, generate considerable noise and extraneous radiant energy which requires additional filtering and shielding.

SUMMARY OF THE INVENTION

In accordance with the present invention, a line frequency switching power supply is provided in which the favorable attributes of the linear and switching supplies are combined while the disadvantages are eliminated.

A series-pass element disposed between a rectifier stage and a capacitive filter is operated at a low duty cycle to provide a regulated D.C. voltage output. On a given half-cycle of A.C. power line voltage, the series-pass element does not turn on until the voltage on the filter capacitor, plus the operational drop across the pass element, is exceeded. The series-pass element is turned off when the voltage on the filter capacitor charges to a selected nominal D.C. output level. Thus, the duty cycle of the series-pass element depends upon the discharge RC characteristics of the filter and the load.

The circuit for operating the series-pass element includes a drive circuit for biasing the pass element, a latch for disabling the drive circuit when a selected nominal output voltage is reached, and a zero-crossing detector for resetting the latch and enabling the drive circuit when the line voltage passes through zero.

Since the series-pass element is on for only a short time each cycle, unused power is not dissipated as heat, and efficiency is kept high. Additionally, several supply voltages may be obtained from the same transformer secondary winding as long as the on-times of the respective pass elements do not overlap. Since the circuit operates at line frequency (or twice the line frequency for full-wave rectifiers), no high-frequency noise is produced, reducing or eliminating the need for electromagnetic interference (EMI) or radio-frequency interference (RFI) filtering.

The line frequency switching power supply of the invention is particularly attractive as a high-efficiency preregulator preceeding a final regulator stage. Since the output of the preregulator (in this instance) is maintained within a constant operating window, the final regulator may be designed such that its pass element responds only to that operating window, resulting in extremely high efficiency.

It is therefore one feature of the present invention to provide a novel line frequency switching power supply wherein the switched element is a series-pass element disposed between a rectifier circuit and a filter.

It is another feature of the present invention to provide a switching regulator that is high in efficiency, runs cool, and requires little or no EMI or RFI filtering.

It is another feature of the present invention to provide multiple regulated D.C. supplies from a single transformer secondary winding.

Other features, benefits, and attainments of the present invention will become obvious to those having ordinary skill in the art upon a reading of the following detailed description when taken in conjunction with the accompanying drawings.

DRAWINGS

DETAILED DESCRIPTION OF THE INVENTION

Figure 1:
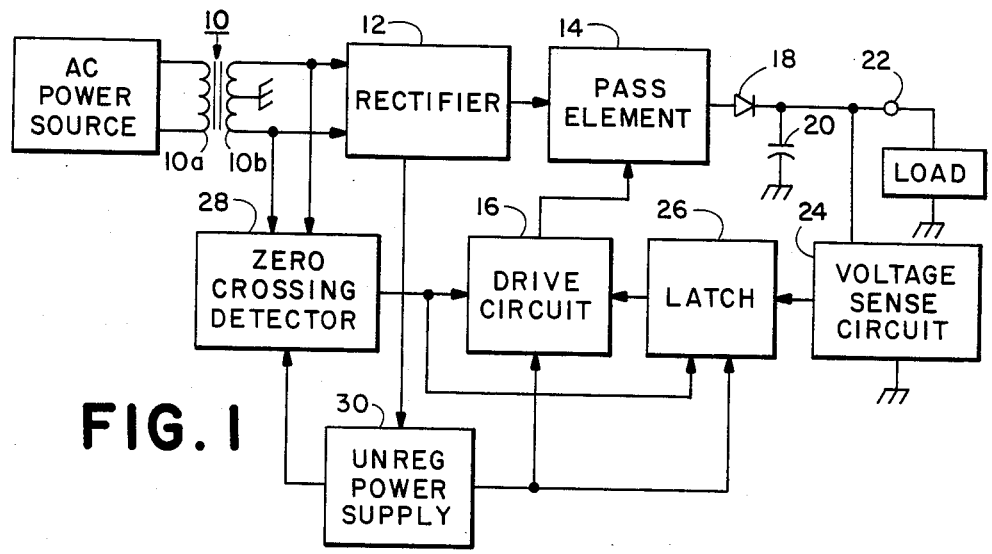
FIG. 1 is a block diagram of a line frequency switching power supply in accordance with the present invention.

Before discussing detailed circuit operation, an overview of the line frequency switching power supply in accordance with present invention will be provided in conjunction with the block diagram of FIG. 1. Line voltage from an A.C. power source is impressed across the primary winding 10a of a transformer 10 and induced into the secondary winding 10b. A rectified pulsating D.C. voltage is produced by a rectifier 12 in conventional half-wave or full-wave fashion, and is applied to a series-pass element 14 which is rendered conductive and non-conductive synchronously with cycles of power line voltage from the A.C. power source by a drive circuit 16, as will become apparent shortly. The output of series-pass element 14 is applied via a disconnect diode 18 to a large filter capacitor 20 to provide a rectified and filtered D.C. output voltage Eo to a load connected to output terminal 22.

A voltage-sense circuit 24 monitors the output voltage and trips latch 26 when the output voltage reaches a predetermined Eo point, causing drive circuit 16 to shut off the series pass element 14. This action normally occurs before the peak (positive or negative) of the line voltage occurs, and indeed may be at any point on the rising (or falling) portion of the line voltage sine wave curve, depending upon the polarity and value of Eo selected and peak amplitude of the line voltage. When the series pass element 14 is switched off, diode 18 becomes reverse biased and switches off as well, ensuring that any load at terminal 22 is disconnected from the transformer secondary winding (allowing the line voltage across the secondary winding to continue unloaded). With the load so disconnected, capacitor 20 begins to discharge at an RC-controlled rate through the load.

A zero-crossing detector 28 resets latch 26 and activates drive circuit 16 when the line voltage reaches zero after having reached the peak of the line voltage curve and reversing; however, even though pass element 14 is enabled by drive circuit 16, it remains off until the voltage from rectifier 12 reaches a point that exceeds the voltage on filter capacitor 20, plus the operational voltage drop across pass element 14 and disconnect diode 18, and the cycle is repeated. If rectifier 12 is a half-wave rectifier, this occurs on the next line voltage cycle. If rectifier 12 is a full-wave rectifier, this occurs on the second half of the cycle—that is, the cycle repeats twice for each cycle of line voltage. It can be understood, then, that greater efficiency can be achieved by employing full-wave rectification. Also, because the filter capacitor cannot discharge as far when full-wave rectification is employed, the conduction time of pass element 14 may be much shorter than required for half-wave rectification, reducing power dissipation and resulting in a cooler operating temperature.

A power supply 30 is also connected to rectifier 12 to provide an unregulated D.C. supply voltage for operation of the various elements in the power supply.

It can be discerned that while the line voltage may fluctuate or vary substantially, e.g., over a range from about 90 VAC to about 132 VAC, the output voltage Eo is maintained within fairly tight limits and varies only with filter capacitor charge and discharge, not line voltage variations. This feature of the present invention permits the line switching power supply described herein to be used as a preregulator for which the load is a final regulator stage, such as a linear voltage regulator designed such that the pass element thereof responds only to the constant output voltage window at terminal 22. Thus a final output D.C. supply voltage may be generated which is highly regulated and very stable, with very little power dissipated as heat.

Figure 2:
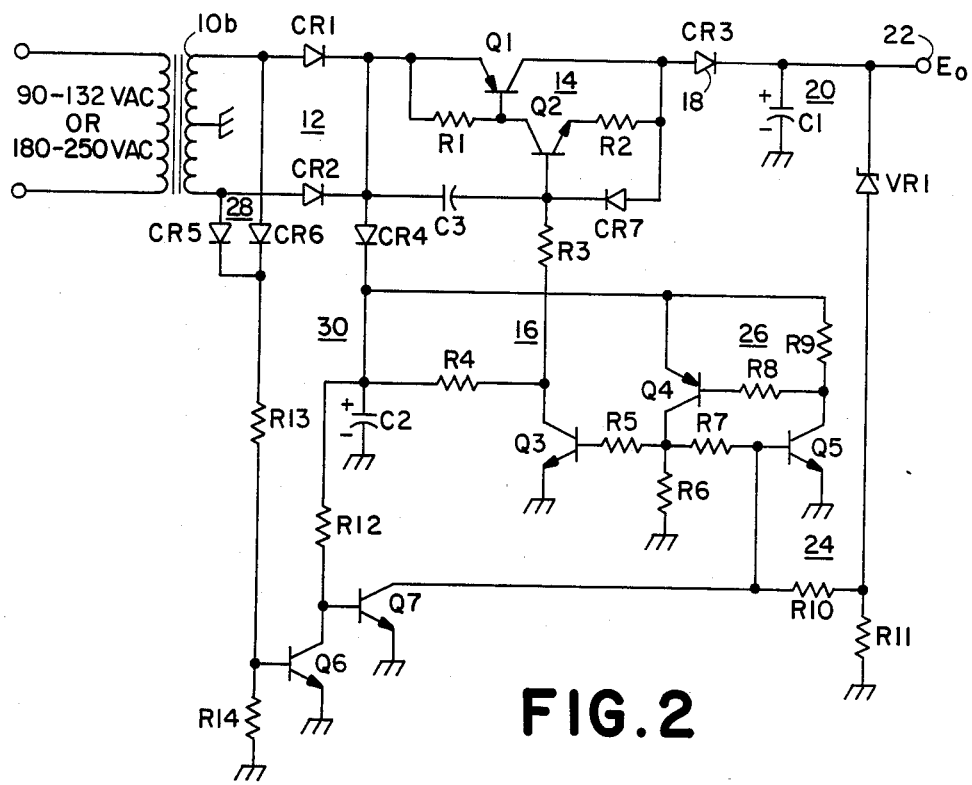
FIG. 2 is a detailed circuit schematic of preferred embodiment of the present invention.

A detailed schematic of a positive supply voltage (+Eo) version of a preferred embodiment of the present invention is shown in FIG. 2. For a negative supply voltage (−Eo) version, simply reverse the polarities of the circuit elements shown. Circuit elements corresponding to those in FIG. 1 have like reference numerals, and an easy comparison may be made between the circuit of FIG. 2 and the block diagram of FIG. 1.

Rectifier 12 is a full-wave rectifier comprising diodes CR1 and CR2, the cathodes of which are connected together and the anodes of which are connected to opposite ends of grounded center tapped secondary winding 10b.

Pass element 14 is a modified Darlington-transistor power circuit comprising transistors Q1 and Q2, and associated resistors R1 and R2. Disconnect diode 18 and filter 20 comprise diode CR3 and capacitor C1, respectively. Zener diode VR1 is connected in series with voltage-sense resistor R11 between output terminal 22 and ground to establish the value of Eo.

Latch 26 comprises output transistor switch Q3, and transistors Q4 and Q5 connected with associated resistors R5-R6-R7-R8-R9 to form a bistable latch. Drive circuit 16 comprises resistors R3 and R4 which provide base drive to transistor Q2 of the pass element when switch transistor Q3 is off. Resistor R3 together with capacitor C3 form a snubber circuit to ensure smooth turn-off of the pass element at a controlled rate thereby to prevent fast transients or spikes from being generated. Diode CR7 provides protection from polarity reversals.

Zero-crossing detector 28 comprises diodes CR5 and CR6, transistors Q6 and Q7, and resistors R12, R13, and R14. At the zero crossover point, the base of transistor Q6 goes to ground, turning off normally-conducting transistor Q6, and turning transistor switch Q7 on. The results of this action will be discussed below in connection with FIG. 3.

The unregulated power supply 30 for operation of the line frequency switching power supply comprises diode CR4 and capacitor C2. Diode CR4 follows the output of full-wave rectifier diodes CR1 and CR2, charging capacitor C2.

Figure 3:
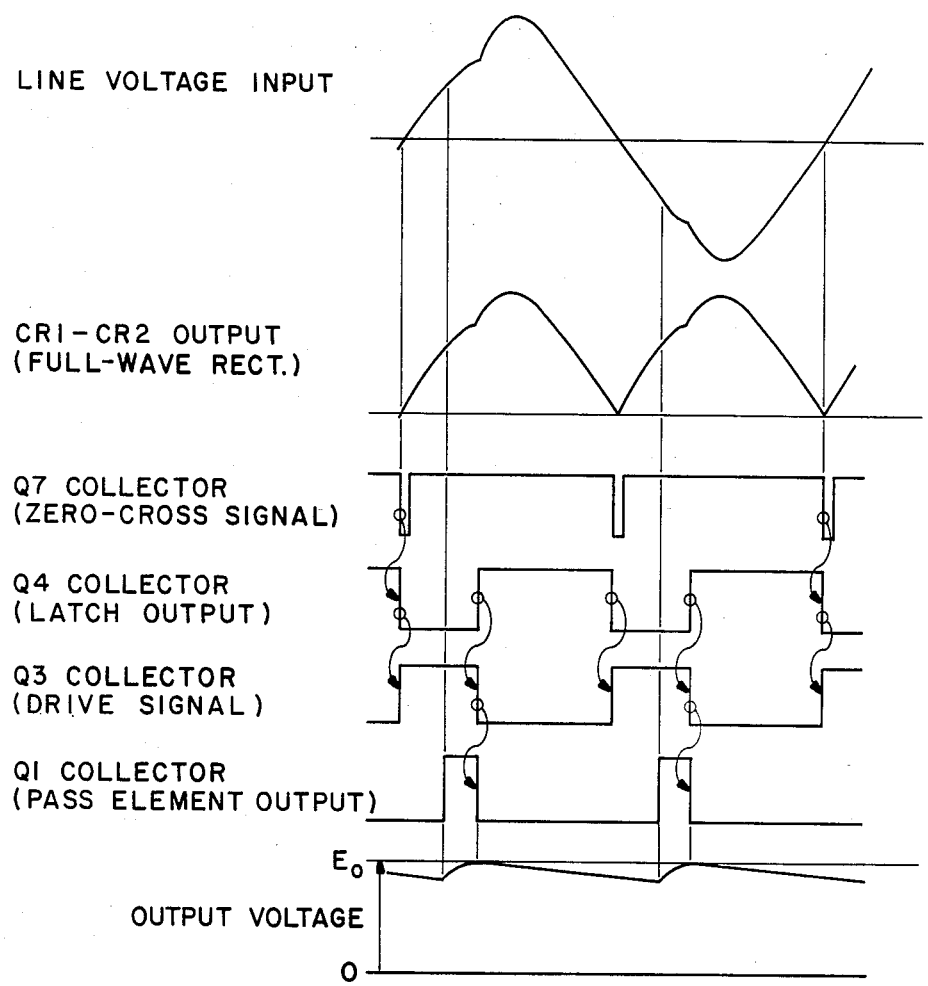
FIG. 3 is a waveform diagram to aid in understanding the operation of the circuit of FIG. 2.

Operation of the circuit of FIG. 2 will now be discussed in connection with the waveforms shown in FIG. 3. The timing and amplitudes of the waveforms are for illustrative purposes, and therefore are not to any particular scale. Assume that pass element 14 is turned off and that the line voltage waveform is positive-going and passing through zero. As the base of transistor Q6 is grounded momentarily, transistor Q7 turns on, its collector snapping negative to ground as the transistor saturates, resetting latch 26 by pulling the base of transistor Q5 negative. Transistor Q5 turns off, turning off transistors Q4 and Q3, allowing the voltage on capacitor C2 to be applied as base drive via resistors R4 and R3 to transistor Q2. This action is indicated in FIG. 3 by showing that the negative-going Q7 collector voltage causes the collector of Q4 to go negative, in turn causing the collector of Q3 to go positive. As the line voltage rises away from zero, diode CR6 begins to conduct, pulling the base of Q6, and hence, the collector of Q7, positive.

Diode CR1 also begins to conduct as the line voltage rises away from zero, applying an increasingly positive voltage to the emitter of transistor Q1. Note that while the pass element has been enabled by the drive voltage through resistor R4, transistor Q1 will not necessarily turn on as soon as a positive voltage is applied to its emitter. Transistor Q1 turns on when the voltage from CR1–CR2 rises sufficiently positive to exceed the voltage on capacitor C1, plus the voltage drops across Q1 and diode CR3. Capacitor C1 receives the current passed by transistor Q1 and charges to the Eo point set by Zener diode VR1. VR1 conducts when the voltage thereacross reaches the operating voltage specified for the particular Zener diode used, pulling current through voltage-sense resistor R11. When the voltage drop across R11 is sufficent to bias latch transistor Q5 into conduction, the latch is tripped, turning on transistors Q4 and Q3. When transistor Q3 turns on, its collector goes to ground potential, turning off transistors Q2 and Q1 of pass element 14. This action is depicted in FIG. 3 by the negative-going transition on the collector of Q1. Disconnect diode CR3 is also reversed biased at this point, disconnecting filter capacitor C1 from the pass element, allowing C1 to begin to discharge through the load as Zener diode also turns off. Of course, with pass element 14 off, the line voltage continues unloaded to its peak.

For full-wave rectification, the above operation is repeated on the negative-going half-cycle of the line voltage. That is, the pass element 14 is switched on and off at twice the line-frequency rate.

The exact turn-on point of transistor Q1 depends largely on the state of charge of filter capacitor C1. Of course, when the power supply is first turned on, there is no charge on the capacitor, and Q1 will turn on as soon as the voltage drops of Q1 and CR3 are exceeded. However, after the supply has built up to its nominal Eo level (typically within half a cycle of line voltage), the voltage across C1 will vary between Eo and some value less than Eo, depending upon the impedance of the load. If the load has a high impedance, C1 will discharge very little on each cycle, so that the pulse width of pass element 14 will be quite narrow. That is, the duty cycle, defined as the ratio of pass element conduction time to a complete cycle, will be quite low. Hence, power dissipated as heat will be quite low, and power supply efficiency will be high.

Figure 4A:
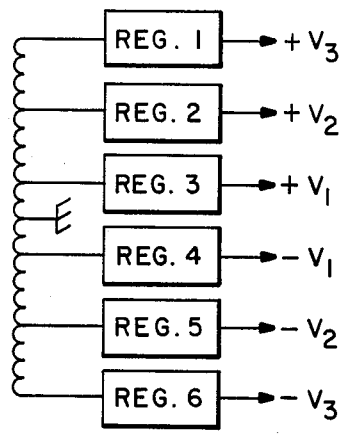
FIG. 4A is a block diagram of multiple regulators in accordance with the present invention connected to a single transformer winding.
Figure 4B:
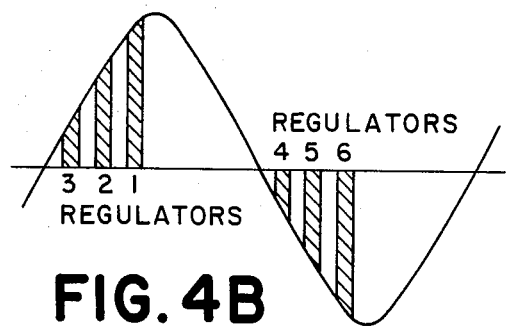
FIG. 4B illustrates a half-cycle of line voltage across the winding of FIG. 4A.

FIG. 4A illustrates how several regulators of the type described in FIGS. 1 and 2 may be stacked on a single secondary winding of a transformer. Of course, proper polarities must be observed to produce +Eo and −Eo. Here, regulator Nos. 3 and 4 are connected to the winding near the center tap, and produce voltages + and −V1. Regulator Nos. 2 and 5 are connected at some intermediate point on the secondary winding, and produce voltages + and −V2. Regulator Nos. 1 and 6 are connected near the ends of the winding, and produce voltages + and −V3. The regulators are designed such that the conduction times of the pass elements of the respective regulators do not overlap. This can be understood by referring to FIG. 4B, wherein the conduction times of the respective regulators are shown as shaded areas on a cycle of line voltage. Regulator Nos. 1, 2, and 3 conduct on the positive half cycle to produce the positive supply voltages and regulator Nos. 4, 5, and 6 conduct on the negative-going half cycle to produce the negative supply voltages. The diagram of FIG. 4B is to illustrate the technique, without being specific as actual times. Of course, it should be understood that the voltages produced by the respective regulators are progressively higher in amplitude from the grounded center tap of the secondary winding to the outer extremities. For example, a multiple-output power supply such as that depicted in FIG. 4A could produce supply voltages of + and −5 volts, + and −18 volts, and + and −30 volts from a single winding having about 65 volts peak to peak.

While the principles of the invention have now been made clear in the foregoing illustrative embodiment, there will be made immediately obvious to those skilled in the art that many modifications, arrangements, proportions, the elements, materials and components used in the practice of the invention, and otherwise, which are particularly adapted for specific environments and operating requirements may be made without departing from those principles. For example, while no specific component values have been given, the skilled artisan would have no difficulty in selecting values as a matter of design choice. Also, the latch and switching transistors could be replaced by flip-flops or comparators. The appended claims are therefore intended to cover and embrace any such modifications within the scope of the invention.

What I claim as being novel is:

1. A power supply, comprising:
   a rectifier circuit coupled to a secondary winding of a transformer adapted to receive a cyclic line voltage, said rectifier circuit producing a pulsating D.C. voltage;
   a pass element coupled to said rectifier circuit;
   a filter coupled to said pass element to provide a filtered D.C. output voltage in response to the output of said pass element;
   means for sensing when said output voltage reaches a predetermined value;
   latch means coupled to said sensing means and responsive thereto to switch said pass element off; and
   means for detecting when said line voltage crosses a zero point in its cycle and resetting said latch means and enabling said pass element.

2. A power supply in accordance with claim 1 further comprising disconnect means interposed between said pass element and said filter to isolate the power supply output from the rectifier circuit when said pass element is switched off.

* * * * *